United States Patent
Feldman (10) Patent No.: US 12,319,167 B2
(45) Date of Patent: Jun. 3, 2025

(54) SENDING SAMPLED METER DATA FROM AN ELECTRIC VEHICLE CHARGER TO A BACKEND FOR REPORTING VIA OPEN CHARGE POINT PROTOCOL (OCPP) FOR USE BY A UTILITY TO CHARGE A CUSTOMER

(71) Applicant: Siemens Industry, Inc., Alpharetta, GA (US)

(72) Inventor: Daniel Feldman, New York, NY (US)

(73) Assignee: Siemens Industry, Inc., Alpharetta, GA (US)

( * ) Notice: Subject to any disclaimer, the term of this patent is extended or adjusted under 35 U.S.C. 154(b) by 245 days.

(21) Appl. No.: 18/332,255

(22) Filed: Jun. 9, 2023

(65) Prior Publication Data
US 2024/0408997 A1 Dec. 12, 2024

(51) Int. Cl.
*B60L 53/66* (2019.01)
*G06Q 30/04* (2012.01)
*G06Q 50/06* (2024.01)

(52) U.S. Cl.
CPC ............ *B60L 53/665* (2019.02); *G06Q 30/04* (2013.01); *G06Q 50/06* (2013.01); *B60L 2240/70* (2013.01)

(58) Field of Classification Search
None
See application file for complete search history.

(56) References Cited

U.S. PATENT DOCUMENTS 11,794,603 B2 * 10/2023 Logvinov ............. B60L 53/665
2014/0309956 A1   10/2014 Mondot

FOREIGN PATENT DOCUMENTS

WO   WO-2020221959 A1 * 11/2020 ............. B60L 53/62

OTHER PUBLICATIONS

Anonymous:; "OCPP 2.0. Part 2—Specification"; Intern ET Citation, Mar. 31, 2018 (Mar. 31, 2018); pp. 1-410; XP009547976; Retrieved from the Internet: URL:https://www.smartcharge.com.br/artigos/ocpp/OCPP-2.0_part2_specification.pdf.

* cited by examiner

*Primary Examiner* — Ariel J Yu (57) ABSTRACT

A system and a method of sending sampled meter data from an electric vehicle charger to a backend for reporting via Open Charge Point Protocol (OCPP) for use by a utility to charge a customer for a power usage bill is provided. The method comprises sampling the meter data during a charging session of an electric vehicle (EV) at the electric vehicle charger being in an offline state to generate a raw utility billing cycle interval data and session data and a raw greater than 45-days interval data and session data. The method further comprises not sending the raw utility billing cycle interval data and session data as is from the electric vehicle charger to the backend. The method comprises sending a summary of the raw utility billing cycle interval data and session data in a format compliant with the OCPP to be interrupted correctly by an OCPP server.

20 Claims, 4 Drawing Sheets

```
                                          ┌─ 200
```

| Sample meter data during a charging session of an electric vehicle (EV) at the electric vehicle charger being in an offline state to generate a raw 15-minute interval data and session data and a raw 90-day interval data and session data for sending sampled meter data from the electric vehicle charger to a back end for reporting via Open Charge Point Protocol (OCPP) for use by a utility in order to charge a customer for a power usage bill | ─ 205 |

| Not send the raw 15-minute interval data and session data as is from the electric vehicle charger to the back end | ─ 210 |

| Send a summary of the raw 15-minute interval data and session data in a format compliant with the OCPP to be interrupted correctly by an OCPP server | ─ 215 |

SENDING SAMPLED METER DATA FROM AN ELECTRIC VEHICLE CHARGER TO A BACKEND FOR REPORTING VIA OPEN CHARGE POINT PROTOCOL (OCPP) FOR USE BY A UTILITY TO CHARGE A CUSTOMER

BACKGROUND

1. Field

Aspects of the present invention generally relate to sending sampled meter data from an electric vehicle charger to a backend for reporting via Open Charge Point Protocol (OCPP) for use by a utility to charge a customer.

2. Description of the Related Art

Unlike gas-powered vehicles, electric vehicles (EVs) do not require internal combustion engines to operate. Outfitted with an electric motor and a rechargeable battery pack, EVs move along our roadways without burning up gasoline, or producing harmful exhaust emissions, while generating less noise pollution. The world of transportation continues to rapidly evolve. Sales of electric vehicles (EVs) are expected to expand rapidly in the US in the coming years. Economics aside, there are growing social and political initiatives toward "clean" energy that will push this to become reality. A number of market forecasts indicate electric vehicles will account for nearly 1 in 5 of all vehicles sold within the next 10 years. It is estimated approximately 3 million EVs will be sold in the US in 2028. A rule of thumb by industry analysts is there need be on the order of 20 public EVC stations per EV on the road to support the ecosystem. There were just over 60,000 charging stations in the US at the end of 2019. Thus, tens of thousands will need to be deployed every year for some time as the market grows.

Charging stations have provided hundreds of millions of charges to EV (electric vehicle) drivers worldwide. When it comes to electric vehicles, the converter is built inside the car. It's called the "onboard charger" though it really is a converter. It converts power from AC to DC and then feeds it into the car's battery. This is the most common charging method for electric vehicles today and most chargers use AC power.

An EV is connected to AC power, 120V or 240V, and a battery charger in the EV converts the AC power to the DC needed to charge the battery and controls the charging process. In DCFC the DCFC converts the AC power to DC and the DC power is sent directly to the EV battery bypassing the onboard battery charger. There are three categories or types of charging: Trickle Charge, AC Charge and DC Charge. Most drivers of electric vehicles (EVs)—which include all-electric vehicles and plug-in hybrid electric vehicles (PHEVs)—charge their vehicles overnight at home using AC Level 1 or AC Level 2 charging equipment.

A charging station, also known as a charge point or electric vehicle supply equipment (EVSE), is a piece of equipment that supplies electrical power for charging plug-in electric vehicles (including electric cars, electric trucks, electric buses, neighborhood electric vehicles, and plug-in hybrids). There are two main types: AC charging stations and DC fast chargers. Batteries can only be charged with direct current (DC) electric power, while most electricity is delivered from the power grid as alternating current (AC). For this reason, most electric vehicles have an onboard charger with an AC-to-DC converter (a rectifier). At an AC charging station, power is supplied to the onboard charger.

Utilities in the USA and the Nordics require chargers to store up to 90 days of 15-minute interval data information, including total energy, peak power, average voltage, etc. They also require storing charging session information. In case there is a long-term lack of connectivity, chargers are expected to send this information to the backend for processing back information. This information can consume a large space in the charger storage, and then take a very long time to be sent to the backend, if a standard OCPP message flow is used.

It has been solved with proprietary messages, which do not allow delivery to a standard OCPP server, or with standard OCPP messages that normally cover only a few days.

Therefore, there is a need for a system and a method for a low storage, low bandwidth long term interval data reporting via OCPP.

SUMMARY

Briefly described, aspects of the present invention relate to sending sampled meter data from an electric vehicle charger to a backend for reporting via Open Charge Point Protocol (OCPP) for use by a utility to charge a customer. The invention describes a method to send 90 days of 15-minute interval and session data in a format compliant with OCPP, while being extremely compact. The relevant minimum information needed by the utilities is sent, greatly reducing size, speed and cost of storage. A system is able to send 90-days of interval data in an OCPP-compliant manner compatible with all OCPP backends. A system and a method are provided for a low storage, low bandwidth long term interval data reporting via OCPP. When offline an EVSE shall cache messages that would send during a charging session, for the first 15 minutes. After 15 minutes have passed, the sampled meter data should be summarized, so there is a single message representing the 15-minute interval, with average power, peak power for the interval and energy delivery by that interval. This allows a CPO to calculate per 15-minute interval energy data for the utilities. If more than 90 days have passed in an offline state, older messages should be deleted, so the buffer space used to store does not explode. If additional measurands are desired to be tracked by the CPO they should be tracked as an average for the 15-minute interval.

In accordance with one illustrative embodiment of the present invention, a method of sending sampled meter data from an electric vehicle charger to a backend for reporting via Open Charge Point Protocol (OCPP) for use by a utility to charge a customer for a power usage bill is provided. The method comprises sampling the meter data during a charging session of an electric vehicle (EV) at the electric vehicle charger in an offline state to generate a raw utility billing cycle interval data and session data and a raw greater than 45-days interval data and session data. The method further comprises not sending the raw utility billing cycle interval data and session data as is from the electric vehicle charger to the backend. The method further comprises sending a summary of the raw utility billing cycle interval data and session data in a format compliant with the OCPP to be interrupted correctly by an OCPP server.

In accordance with one illustrative embodiment of the present invention, a system is provided. It comprises an electric vehicle charger in communication with a Charge Point Operator (CPO) software code that is configured for gathering session information as charging happens such that Open Charge Point Protocol (OCPP), during a charging session, allows the electric vehicle charger to report every X seconds (X is configurable) the energy dispensed during the charging session. These messages are dated/timed so the CPO software code can use these dates/times to determine what was the energy consumption in any given 15-minute interval. The electric vehicle charger is configured to send sampled meter data from the electric vehicle charger to a backend for reporting via the Open Charge Point Protocol (OCPP) for use by a utility to charge a customer for a power usage bill. The electric vehicle charger to: sample the meter data during the charging session of an electric vehicle (EV) at the electric vehicle charger in an offline state to generate a raw utility billing cycle interval data and session data and a raw greater than 45-days interval data and session data, not send the raw utility billing cycle interval data and session data as is from the electric vehicle charger to the backend and send a summary of the raw utility billing cycle interval data and session data in a format compliant with the OCPP to be interrupted correctly by an OCPP server.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that provide a system and a method for a low storage, low bandwidth long term interval data reporting via OCPP are presented. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a system and a method for a low storage, low bandwidth long term interval data reporting via OCPP. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the system and the method are provided for a low storage, low bandwidth long term interval data reporting via OCPP according to the present disclosure are described below with reference to FIGS. 1-4 herein. Like reference numerals used in the drawings identify similar or identical elements throughout the several views. The drawings are not necessarily drawn to scale.

The term electric vehicle (EV), as used herein, refers to a motorized vehicle deriving locomotive power, either full-time or part-time, from an electric system on board the motorized vehicle. By way of non-limiting examples, an EV may be an electrically powered passenger vehicle for road use; an electric scooter; an electric fork lift; a cargo-carrying vehicle powered, full-time or part-time, by electricity; an off-road electrically powered vehicle; an electrically powered watercraft; etc.

The term electric vehicle supply equipment (EVSE), as used herein, refers to equipment by which an EV may be charged or recharged. An EVSE may comprise or be coupled to a computing system whereby service to the EV is provisioned, optionally, according to parameters. In some embodiments, values for the parameters are operator-selectable. Alternatively, or in addition, the values for the parameters may be automatically selected. An EVSE may comprise a means of providing cost accounting, and may further comprise a payment acceptance component. An EVSE may be installed at a home or residence of an owner/operator of an EV, at a place of business for an owner/operator of an EV, at a fleet facility for a fleet comprising one or more EVs, at a public charging station, etc. The present disclosure uses the terms EVSE and "charging station," where for purposes of this disclosure, an EVSE is an example of a charging station.

An EVSE may be portable such that it can be brought by a user to various locations and used to charge an EV. For example, a user may install and use an EVSE at home to charge an EV. The user may then travel to a friend or family member's home, bringing the EVSE, and install and use the EVSE to charge the EV at the friend or family member's home.

The EVSE can be installed by connecting a plug of the EVSE to an electrical outlet at the installation location. The EVSE may then be used to deliver electricity to an EV for charging. However, electrical conditions may vary based on the installation location, which may impact EVSE performance, and the EVSE may need to be configured at different installation locations. Configuring the EVSE may be time and/or labor intensive, but improper configuring can be detrimental. For example, a maximum current delivered by the EVSE may vary based on the electrical conditions where the EVSE is installed, so the EVSE may need to be configured to determine a correct maximum current. Otherwise, use of the EVSE having an improper configuration may cause an electrical fault, tripping a circuit breaker of the installation location and disrupting charging. Accordingly, embodiments of the present disclosure relate to techniques for determining an EVSE configuration at each location where an EVSE is installed.

The Open Charge Point Protocol (OCPP) is an application protocol for communication between Electric vehicle (EV) charging stations and a central management system, also known as a charging station network, similar to cell phones and cell phone networks. ISO 15118 protocol is an international standard that defines a communication protocol between EVs and charge stations. The protocol enables plug & charge capability, wherein authorization to start charging is triggered simply by connecting a vehicle to a charger.

The ISO 15118 protocol defines an additional communication channel use-case Value-Added-Service (VAS) between vehicle and infrastructure to exchange data, which is not defined in the ISO 15118 protocol itself. The endpoint of this communication channel is usually not the charging station, but a separate backend server. With this mechanism, the vehicle can offer additional data or control interfaces for special use cases. This is already used by electric busses to control the preconditioning and to optimize the load management. Since the OCPP connection and the VAS connection are completely separated communication channels, a mapping is required. For this purpose, a common identifier is required which is provided by both communication channels and which allows a mapping.

Figure 1:
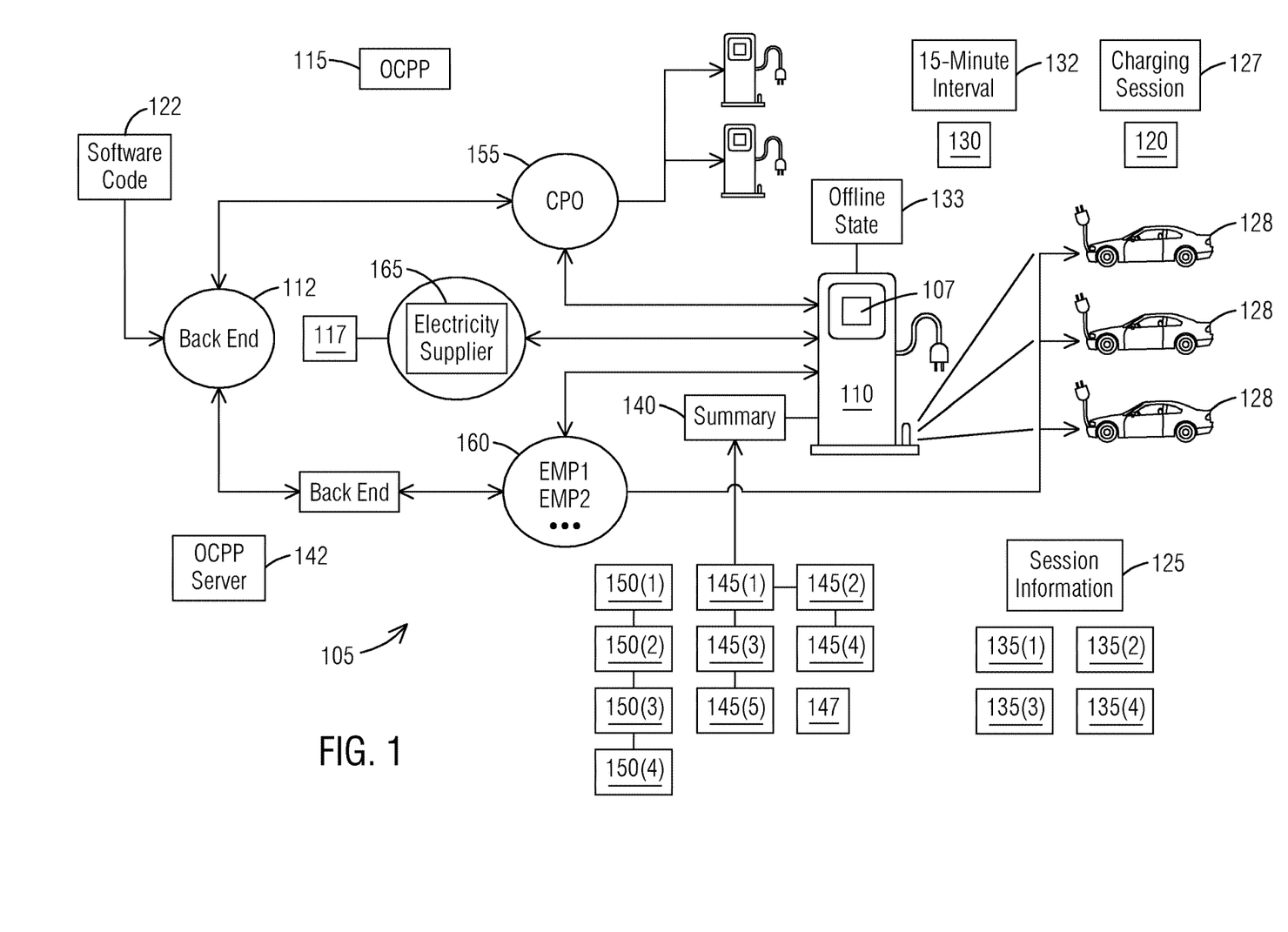
FIG. 1 illustrates a system for sending sampled meter data from an electric vehicle charger to a backend for reporting via Open Charge Point Protocol (OCPP) for use by a utility to charge a customer in accordance with an embodiment of the present invention.

Consistent with one embodiment of the present invention. FIG. 1 represents a system 105 for sending sampled meter data 107 from an electric vehicle charger 110 (e.g., an electric vehicle supply equipment (EVSE)) to a backend 112 for reporting via Open Charge Point Protocol (OCPP) 115 for use by a utility 117 to charge a customer 120 in accordance with an embodiment of the present invention. The electric vehicle charger 110 is in communication with a Charge Point Operator (CPO) software code 122 that is configured for gathering session information 125 as charging happens such that the Open Charge Point Protocol (OCPP) 115, during a charging session 127, allows the electric vehicle charger 110 to report every X seconds (X is configurable) the energy 130 dispensed during the charging session 127. These messages are dated/timed so the CPO software code 122 can use these dates/times to determine what was the energy consumption in any given 15-minute interval 132. The electric vehicle charger 110 is configured to send the sampled meter data 107 from the electric vehicle charger 110 to the backend 112 for reporting via the Open Charge Point Protocol (OCPP) 115 for use by the utility 117 to charge the customer 120 for a power usage bill.

The electric vehicle charger 110 to: sample the meter data during the charging session 127 of an electric vehicle (EV) 128 at the electric vehicle charger 110 in an offline state 133 to generate a raw 5 to 15-minute interval data 135(1) {(e.g., interval (hourly, 15-min, 5-min, depending on utility capability/billing cycle and practice and metering equipment capability) kWh usage)/(billing quality hourly interval kWh usage data (in Hour Beginning format) with raw data published for each interval as soon as the utility can make it available)/charging data leads to customer bills as part of a utility billing cycle} and session data 135(2) and a raw greater than 45-days interval data 135(3) and session data 135(4). The electric vehicle charger 110 to: not send the raw 5 to 15-minute interval data 135(1) and session data 135(2) as is from the electric vehicle charger 110 to the backend 112. The electric vehicle charger 110 to: send a summary 140 of the raw 5 to 15-minute interval data 135(1) and the session data 135(2) in a format compliant with the OCPP 115 to be interrupted correctly by an OCPP server 142. The backend 112 used by the CPO 155 company (CPO is a role, backend is the software used by the CPO) is also known the OCPP server 142 and speaks OCPP with the charger 110. So, the "OCPP server" is "OCPP/CPO backend 112", and that's what is communicating with the EV charger 110.

The summary 140 further comprises a total energy 145(1) for a 15-minute interval 147 calculated as an energy end minus an energy beginning. The summary 140 further comprises an average power 145(2) for the 15-minute interval 147 as the average between all power samples performed during the 15-minute interval 147, based on a sample rate 150(1) defined via the OCPP 115 by the OCPP server 142 or a peak power 145(3) for the 15-minute interval 147 as the peak of all power samples performed during the 15-minute interval 147, based on a sample rate 150(2) defined via the OCPP 115 by the OCPP server 142. The summary 140 further comprises an average voltage 145(4) or the 15-minute interval 147 as the average between all voltage samples performed during the 15-minute interval 147, based on a sample rate 150(3) defined via the OCPP 115 by the OCPP server 142. The summary further comprises an average current 145(5) for the 15-minute interval 147 as the average between all current samples performed during the 15-minute interval 147, based on a sample rate 150(4) defined via the OCPP 115 by the OCPP server 142.

A sampling rate may be in a range of 1 second to 1 minute. A message with the summary 140 is sent instead of 900 raw messages when a sample rate is 1 second (1 second sample rate=60 raw messages per minute or 900 raw messages per 15 minutes) substantially lowering a bandwidth and a storage requirement at the electric vehicle charger 110.

After 15 minutes have passed, the sampled meter data 107 is summarized so there is a single message representing the 15-minute interval 147, with an average power or a peak power for the 15-minute interval 147 and an energy delivery by the 15-minute interval 147 such that this process allows a Charge Point Operator (CPO) 155 to calculate per 15-minute interval energy data for utilities. If more than 90 days have passed in the offline state 133, older messages may be deleted so a buffer space used to store those does not explode. If additional measurands are desired to be tracked by the Charge Point Operator (CPO) 155 they should be tracked as an average for a 15-minute interval. The Charge Point Operator (CPO) 155 to send the raw greater than 45-days interval data and session data in an OCPP-compliant manner compatible with all OCPP backends.

Relevant minimum information needed by utilities is sent in the summary 140 without any change on a server side, greatly reducing size, speed and cost of storage. Summarizing information is sent via the summary 140 for periods in which the electric vehicle charger 110 was offline.

The raw 10 to 15-minute interval data and session data can be composed by the Charge Point Operator (CPO) software code 122 by gathering the session information 125 as charging happens such that an OCPP protocol, during the charging session 127, allows the electric vehicle charger 110 to report every X seconds (X is configurable) the energy dispensed during the charging session 127. These messages are dated/timed so the CPO software code 122 can use these dates/times to determine what was the energy consumption in any given 15-minute interval. The Charge Point Operator (CPO) software code 122 for any 15 minute interval older than the most recent 15 minutes, for instead of having a meter sample for every online meter samples interval (which could be every 10 seconds, 30 seconds or at most 60 seconds), store meter samples that are equivalent to what 15-minute interval data would be.

When it comes to pure charging station operation, three players emerge: the charge point operator (CPO) 155, e-mobility provider (EMP) 160 and an electricity supplier or utility 165. The CPO 155 is responsible for the installation, service and maintenance of a charging station such as the electric vehicle charger 110. It is the manager of the charging infrastructure. The CPO 155 does not have to be the owner or investor of the charging station at the same time, there are also lease models, for example. It is responsible for procuring electricity for the charging station. This makes the charging station the final consumer. The EMP 160 enables access to the charging infrastructure. This includes, for example, issuing the charging cards. With this card, the electric vehicle owners identify themselves at the charging station in order to start a charging process. It is the customer's contact when it comes to tariff structures or the handling of charging processes. The backend 112 is the technical infrastructure behind the EMP 160 and the CPO 155 through which the two roles interact. The electricity supplier supplies the charging station with the contractually agreed quantity of electricity. Since the CPO 155 is the final consumer, the charging station can only be supplied by one electricity supplier.

If authentication is used locally through RFID cards, the charging cards (RFID cards) are managed by the user on the EMP 160 platform. In the use cases where this offline charging and 5-minute interval data reporting is relevant, the EMP 160 passes a whitelist of RFID cards to the CPO's backend 112, which loads these cards on the charger 110, so even if the charger 110 is offline the charging card can be used to authenticate.

The CPO 155 is an entity (company), which uses the backend 112 to communicate with the electric vehicle charger 110 using the OCPP 115 protocol. The CPO software code 122 is running on that backend 112. The EMP 160 has its own backend, which interfaces with drivers on one hand, and with the CPO backend 112 on the other hand, using another protocol (can be OCPI. OICP, or a custom API).

Figure 2:
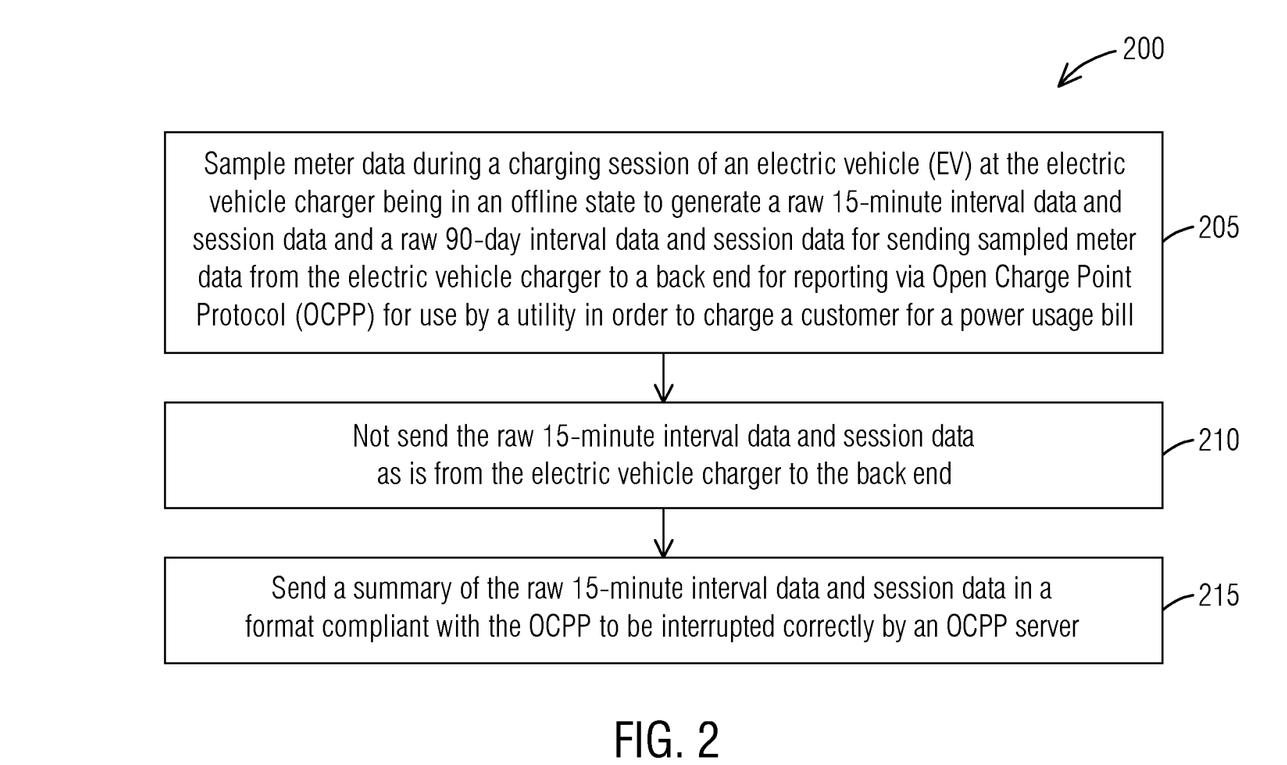
FIG. 2 illustrates a method for sending sampled meter data from an electric vehicle charger to a backend for reporting via Open Charge Point Protocol (OCPP) for use by a utility to charge a customer in accordance with an embodiment of the present invention.

Referring to FIG. 2, it illustrates a method 200 for sending the sampled meter data 107 the electric vehicle charger 110 to the backend 112 for reporting via the Open Charge Point Protocol (OCPP) 115 for use by the utility 117 to charge the customer 120 for a power usage bill in accordance with an embodiment of the present invention. Reference is made to the elements and features described in FIGS. 1, 3-4. It should be appreciated that some steps are not required to be performed in any particular order, and that some steps are optional.

The method 200 comprises a step 205 of sampling the meter data during the charging session 127 of an electric vehicle (EV) at the electric vehicle charger 110 in the offline state 133 to generate the raw 10 to 15-minute interval data 135(1) and the session 135(2) data and the raw greater than 45-days interval data 135(3) and the session data 135(4). The method 200 further comprises a step 210 of not sending the raw 10 to 15-minute interval data 135(1) and the session data 135(2) as is from the electric vehicle charger 110 to the backend 112. The method 200 further comprises a step 215 of sending the summary 140 of the raw 10 to 15-minute interval data 135(1) and the session data 135(2) in a format compliant with the OCPP 115 to be interrupted correctly by the OCPP server 142.

Figure 3:
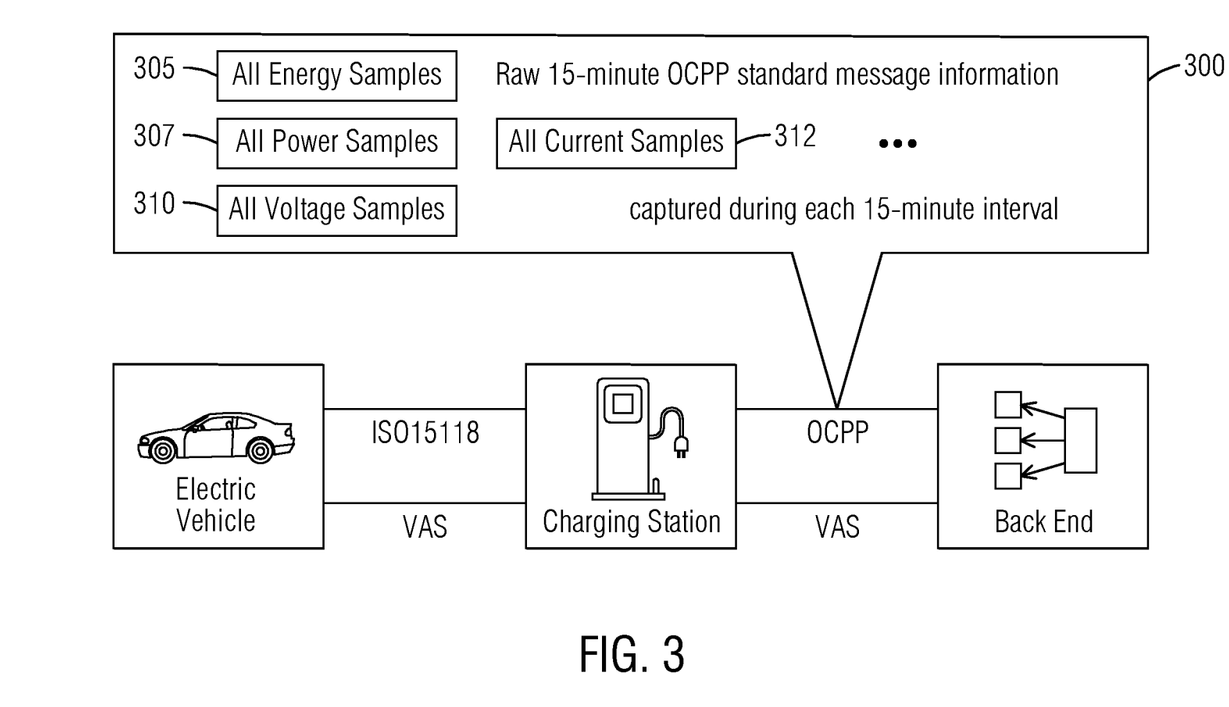
FIG. 3 illustrates a raw 15-minute OCPP standard message information in accordance with an embodiment of the present invention.

Turning now to FIG. 3, it illustrates a raw 15-minute OCPP standard message information 300 in accordance with an embodiment of the present invention. The raw 15-minute OCPP standard message information 300 includes all energy samples 305 performed during a 15-minute interval, based on a sample rate defined via the OCPP by the OCPP server. The raw 15-minute OCPP standard message information 300 further includes all power samples 307 performed during the 15-minute interval, based on a sample rate defined via the OCPP by the OCPP server. The raw 15-minute OCPP standard message information 300 further includes all voltage samples 310 performed during the 15-minute interval, based on a sample rate defined via the OCPP by the OCPP server. For example: If the meter sample interval is 10 seconds, there are 900 sample points, and the voltage reported is the average voltage of these 900 points. Note that there could be voltage reporting separately for 3 phases, in which case the average is calculated for each phase independently. The raw 15-minute OCPP standard message information 300 further includes all current samples 312 per phase performed during the 15-minute interval, based on a sample rate defined via the OCPP by the OCPP server.

Figure 4:
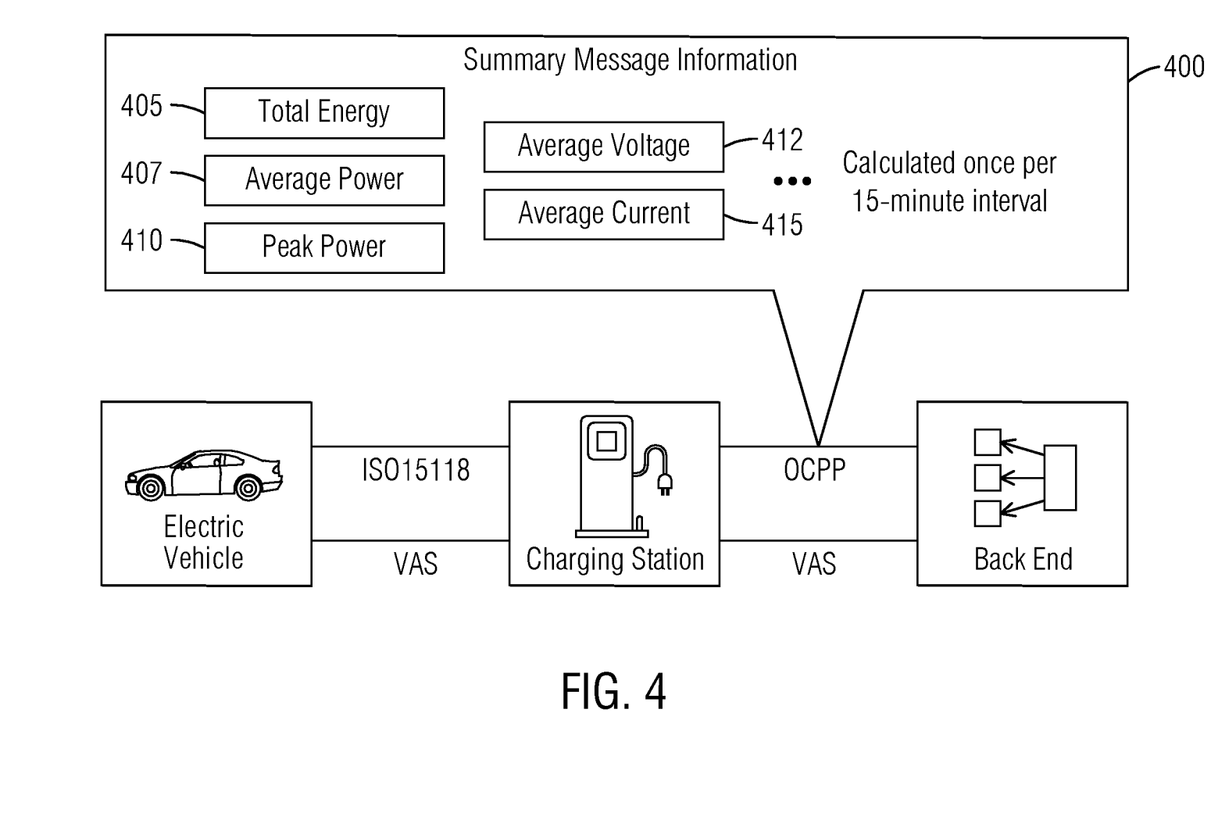
FIG. 4 illustrates a summary message information in accordance with an embodiment of the present invention.

FIG. 4 illustrates a summary message information 400 in accordance with an embodiment of the present invention. The summary message information 400 includes a total energy 405 for a 15-minute interval calculated as an energy end minus an energy beginning, an average power 407 for the 15-minute interval as the average between all power samples performed during the 15-minute interval, based on a sample rate defined via the OCPP by the OCPP server or a peak power 410 for the 15-minute interval as the peak of all power samples performed during the 15-minute interval, based on a sample rate defined via the OCPP by the OCPP server (in the event the system 105 is configured to send the peak power 410, that is the peak of these sample points (900 sample points in the example above), an average voltage 412 for the 15-minute interval as the average between all voltage samples performed during the 15-minute interval, based on a sample rate defined via the OCPP by the OCPP server and an average current 415 for the 15-minute interval as the average between all current samples per phase performed during the 15-minute interval, based on a sample rate defined via the OCPP by the OCPP server. The system 105 is storing this information when offline. And averages for the other physical metrics possible to be reported via OCPP (current, voltage, frequency, etc.). The metric values sent in future variants of OCPP could include also other things like temperature, pressure, humidity, etc.

What is novel is the information that is sent, and what is not sent, not following a standard (which would require to store 900× more samples of data stored and sent) and staying compatible with OCPP servers (because what the system 105 sends it will still be interpreted correctly by a server) without any change on the server side, by summarizing information that is sent for the periods in which the electric vehicle charger 110 was offline. The format is compact because there is a drastic reduction in the number of messages that need to be stored and sent. If the sample meter interval is 10 seconds and the system 105 stores 1 summary message every 15 minutes, we are talking about a reduction in storage of 900 to 1.

While a design based on Open Charge Point Protocol (OCPP) is described here a range of one or more other communication protocols are also contemplated by the present invention. OCPP is the global open communication protocol between charge stations and the back-end systems of charge station operators. For example, other communication protocols may be implemented based on one or more features presented above without deviating from the spirit of the present invention.

The techniques described herein can be particularly useful for electric vehicle supply equipment (EVSE). While particular embodiments are described in terms of an EVSE, the techniques described herein are not limited to such EV charging station but can also be used with other types of EV charging stations.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method of sending sampled meter data from an electric vehicle charger to a backend for reporting via Open Charge Point Protocol (OCPP) for use by a utility in order to charge a customer for a power usage bill, the method comprising:
sampling the meter data during a charging session of an electric vehicle (EV) at the electric vehicle charger being in an offline state to generate a raw utility billing cycle interval data and session data and a raw greater than 45-days interval data and session data;
not sending the raw utility billing cycle interval data and session data as is from the electric vehicle charger to the backend; and
sending a summary of the raw utility billing cycle interval data and session data in a format compliant with the OCPP to be interrupted correctly by an OCPP server.

2. The method of claim 1, wherein the summary further comprising:
a total energy for a 15-minute interval calculated as an energy end minus an energy beginning.

3. The method of claim 2, wherein the summary further comprising:
an average power for the 15-minute interval as the average between all power samples performed during the 15-minute interval, based on a sample rate defined via the OCPP by the OCPP server or a peak power for the 15-minute interval as the peak of all power samples performed during the 15-minute interval, based on a sample rate defined via the OCPP by the OCPP server.

4. The method of claim 3, wherein the summary further comprising:
an average voltage for the 15-minute interval as the average between all voltage samples per phase performed during the 15-minute interval, based on a sample rate defined via the OCPP by the OCPP server.

5. The method of claim 4, wherein the summary further comprising:
an average current for the 15-minute interval as the average between all current samples per phase performed during the 15-minute interval, based on a sample rate defined via the OCPP by the OCPP server.

6. The method of claim 1, wherein a sampling rate is in a range of 1 second to 1 minute.

7. The method of claim 1, wherein a message with the summary is sent instead of 900 raw messages when a sample rate is 1 second (1 second sample rate=60 raw messages per minute or 900 raw messages per 15 minutes) substantially lowering a bandwidth and a storage requirement at the electric vehicle charger.

8. The method of claim 1, wherein after 15 minutes have passed, sampled meter data is summarized so there is a single message representing a 15-minute interval, with an average power or a peak power for the 15-minute interval and an energy delivery by the 15-minute interval such that this process allows a Charge Point Operator (CPO) to calculate per 15-minute interval energy data for utilities.

9. The method of claim 1, wherein if more than 90 days have passed in the offline state, older messages are to be deleted so a buffer space used to store those does not explode.

10. The method of claim 9, wherein if additional measurands are desired to be tracked by a Charge Point Operator (CPO) they should be tracked as an average for a 15-minute interval.

11. The method of claim 1, wherein a Charge Point Operator (CPO) to send the raw greater than 45-days interval data and session data in an OCPP-compliant manner compatible with all OCPP backends.

12. The method of claim 1, wherein relevant minimum information needed by utilities is sent in the summary without any change on a server side, greatly reducing size, speed and cost of storage.

13. The method of claim 1, wherein summarizing information is sent via the summary for periods in which the electric vehicle charger was offline.

14. The method of claim 1, wherein the raw utility billing cycle interval data and session data can be composed by a Charge Point Operator (CPO) software code by gathering session information as charging happens such that the OCPP protocol, during a charging session, allows the electric vehicle charger to report every X seconds (X is configurable) the energy dispensed during the charging session, wherein these messages are dated/timed so the CPO software code can use these dates/times to determine what was the energy consumption in any given 15-minute interval.

15. The method of claim 14, wherein the Charge Point Operator (CPO) software code for any 15 minute interval older than the most recent 15 minutes, for instead of having a meter sample for every online meter samples interval (which could be every 10 seconds, 30 seconds or at most 60 seconds), store meter samples that are equivalent to what 15-minute interval data would be.

16. A system, comprising:
an electric vehicle charger in communication with a Charge Point Operator (CPO) software code that is configured for gathering session information as charging happens such that Open Charge Point Protocol (OCPP), during a charging session, allows the electric vehicle charger to report every X seconds (X is configurable) the energy dispensed during the charging session, wherein these messages are dated/timed so the CPO software code can use these dates/times to determine what was the energy consumption in any given 15-minute interval,
wherein the electric vehicle charger is configured to send sampled meter data from the electric vehicle charger to a backend for reporting via the Open Charge Point Protocol (OCPP) for use by a utility to charge a customer for a power usage bill, the electric vehicle charger to:
sample the meter data during the charging session of an electric vehicle (EV) at the electric vehicle charger in an offline state to generate a raw utility billing cycle interval data and session data and a raw greater than 45 days interval data and session data;
not send the raw utility billing cycle interval data and session data as is from the electric vehicle charger to the backend; and
send a summary of the raw utility billing cycle interval data and session data in a format compliant with the OCPP to be interrupted correctly by an OCPP server.

17. The system of claim 16, wherein the summary further comprising:
a total energy for a 15-minute interval calculated as an energy end minus an energy beginning.

18. The system of claim 17, wherein the summary further comprising:
an average power for the 15-minute interval as the average between all power samples performed during the 15-minute interval, based on a sample rate defined via the OCPP by the OCPP server or a peak power for the 15-minute interval as the peak of all power samples performed during the 15-minute interval, based on a sample rate defined via the OCPP by the OCPP server.

19. The system of claim 18, wherein the summary further comprising:

an average voltage for the 15-minute interval as the average between all voltage samples per phase performed during the 15-minute interval, based on a sample rate defined via the OCPP by the OCPP server.

20. The system of claim 19, wherein the summary further comprising:

an average current for the 15-minute interval as the average between all current samples per phase performed during the 15-minute interval, based on a sample rate defined via the OCPP by the OCPP server.

* * * * *